March 8, 1949.    C. STAFFORD ET AL    2,463,820
WATER JET PROPULSION INTERNAL-COMBUSTION ENGINE
Filed June 26, 1944    3 Sheets-Sheet 1
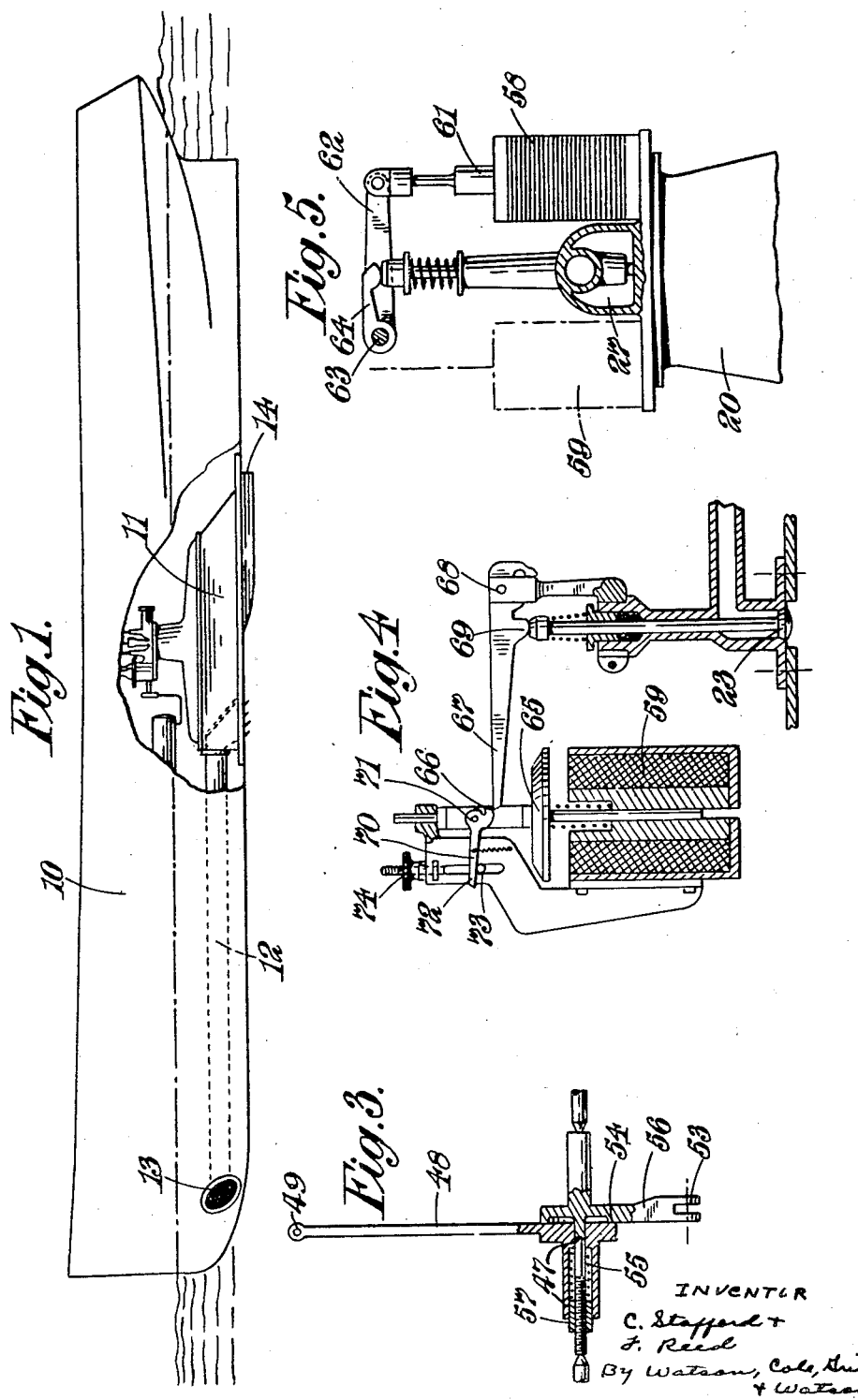

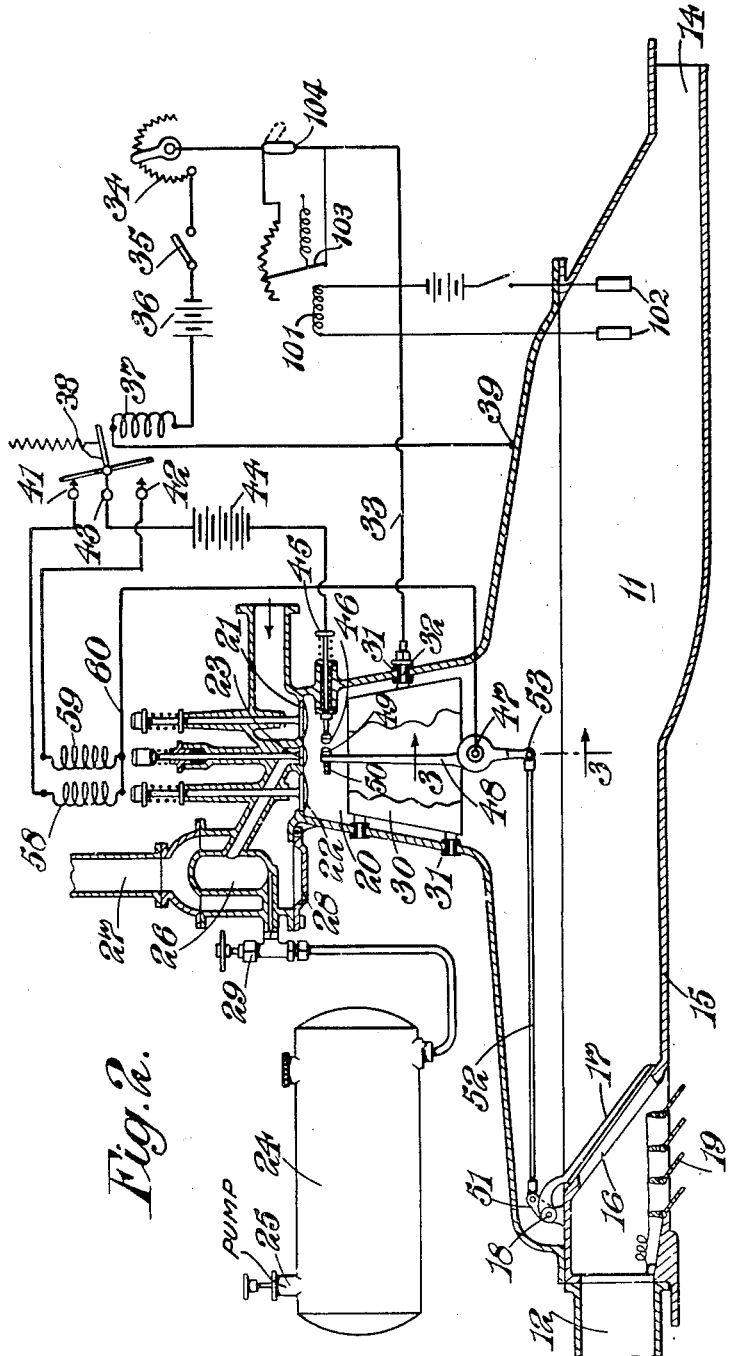

March 8, 1949.  C. STAFFORD ET AL  2,463,820
WATER JET PROPULSION INTERNAL-COMBUSTION ENGINE
Filed June 26, 1944  3 Sheets-Sheet 3
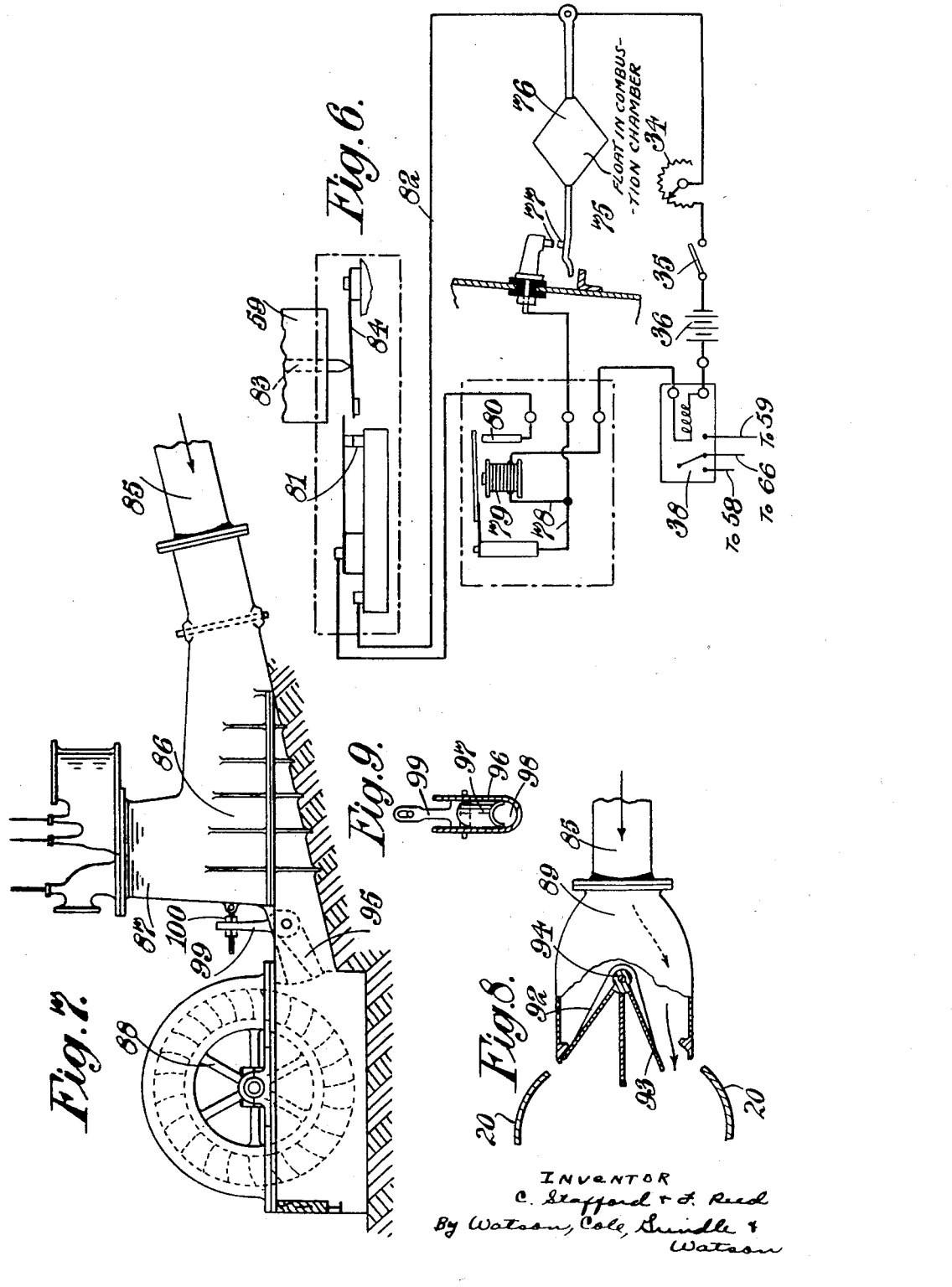

Patented Mar. 8, 1949

2,463,820

UNITED STATES PATENT OFFICE 2,463,820

WATER JET PROPULSION INTERNAL-COMBUSTION ENGINE

Charles Stafford, Rhos-on-Sea, and Frederick Reed, Colwyn Bay, North Wales

Application June 26, 1944, Serial No. 542,152
In Great Britain February 13, 1943

7 Claims. (Cl. 60—35.6)

This invention relates to a means for propelling ships and for other driving purposes.

The underlying principle of the invention is to produce water-pressure by means of a series or succession of internal combustion explosions over water (continuously ejected and replenished), in a vessel from which the water is ejected in the form of a jet or jets. The reaction of the ejected water is used to effect the propulsion of a water craft in the hull of which the apparatus is fixed, or the ejected stream of water may be applied to a turbine or water-wheel to produce rotary movement for driving purposes.

In the case of a jet or jets of water so produced and utilised in part for the production of rotary movement, the apparatus can be adapted to be used as an auxiliary power source for supply of air and electricity needed and used in connection with the form of apparatus employed for water craft propulsion.

The object of the invention is to obtain the maximum power by utilising in the most advantageous manner the weight and velocity of the water entering the vessel or chamber from which it is expelled; the compression of the combustible charge increases as the water×velocity factor increases so that the power unit differs from a normal form of internal-combustion engine which has a fixed compression ratio since an increased compression is obtained at higher speeds. In the case of propelling water craft, the velocity of the entering water is derived from the motion of the vessel through the water, whilst in the case of a stationary power plant the water is circulated in a closed circuit through the explosion chamber.

This invention comprises in a power plant, the combination with a combustion chamber, means for introducing a combustible charge into it, means for igniting said charge and means for exhausting and scavenging the chamber, of an automatic inlet-valve admitting water to the chamber and an open outlet of smaller area than the inlet to deliver at a high velocity therethrough the water expelled by the explosion of the charge.

According to another feature of this invention there is provided in a power plant as above set forth, the combination with air, fuel and exhaust-valves, of electromagnets to operate them and a controlling circuit for said magnets, which circuit is itself controlled by the entry of water into the chamber; the water entering the chamber may be used to electrically connect two relatively insulated parts therein, or it may act on a vane or float to operate thereby a switch in a controlling circuit for the electromagnets.

According to another feature of this invention, the said electromagnets are arranged in circuit with a movable contact which is operatively connected to the water-inlet-valve of the chamber so as to be moved to its closed position by the opening movement of the said valve, and to its open position by the closing movement of the valve. Preferably, the said movable contact is operated by the initial movement of the water-inlet-valve in either direction, and for this purpose it may be operatively connected to the water-inlet-valve through a slipping clutch as hereinafter described.

According to another feature of this invention, the opening of the circuit at the movable contact aforesaid is used to provide a low tension spark for ignition of the explosive charge in the chamber.

According to yet another feature of this invention, a power plant as above described has the air and exhaust-valves spring-controlled towards their closed positions and, they are arranged to be opened by the energizing of the magnet or magnets allocated to them.

According to yet another feature of this invention, the fuel-valve for admission of fuel to the combustion chamber is spring-pressed towards its closed position and is arranged to be opened momentarily by the energizing of the magnet which is allocated to it; such momentary opening may be produced by a trip mechanism as hereinafter described.

According to yet another feature of this invention, the power plant as above described is provided, in the water-inlet-conduit, with a relief-valve in proximity to the water-inlet-valve, and the relief-valve is arranged automatically to be opened when the water-inlet-valve is closed, thereby ensuring an uninterrupted flow of water in the said conduit.

Other features of this invention will be described hereinafter with reference to specific embodiments of the invention, and the novel details pointed out in the claims appended to this specification.

In the accompanying drawings,

Figure 1 is a purely diagrammatic illustration of the application of a power plant according to this invention to the propulsion of a vessel, and for the sake of clarity the power plant is shown much larger in proportion to the size of the vessel than it would be in practice, Figure 2 is a longitudinal sectional view of the power plant with the electrical circuits shown in diagrammatic form, Figure 3 is a detail view, being a section on the line 3—3 of Figure 2, Figure 4 is a sectional view showing one construction of fuel-inlet-valve and its operating mechanism, Figure 5 is a similar view of the operating mechanism for the exhaust and air-inlet-valves, Figure 6 is a circuit diagram of a modified arrangement of electrical control for the valves, Figure 7 is a view in elevation of one form of stationary power plant according to this invention, Figure 8 is a detail view of the water-inlet-valve for a plant as in Figure 7, and Figure 9 is a view of another detail of Figure 7.

Referring first to Figure 1, the hull of a marine craft is indicated generally by the reference 10, and the power plant in accordance with this invention, which is used for its propulsion, is indicated by the reference 11; this power unit is situated at any convenient position in the vessel and is supplied with water through a suitable conduit 12 which extends from an open end 13 at the forward part of the vessel to the power unit. The water is ejected rearwardly from the power unit by a jet or series of jets 14 so that the reaction provides for the propulsion of the vessel.

The construction of the power unit itself is shown diagrammatically in Figure 2 and it comprises a metal chamber 15 which is preferably situated below the water-line of the vessel 10 wherein it is installed; the water-inlet pipe 12 aforesaid opens to an inlet port 16 at the forward end of the chamber, this port being controlled by a valve 17 which is illustrated as a simple flap valve pivoted at 18. It may, however, take any other convenient form and may be constituted by two or more valves, the principal feature of its construction being that it will provide when open a large and easy inlet for water flowing through the pipe 12. In order that the flow of water through this pipe shall not be interfered with, there is provided adjacent the valve 17 a relief port and valve 19 which when the valve 17 is closed, automatically open and provide an easy exit for water which is then flowing in the pipe 12. The effect is that as the vessel is travelling through the water, there is a substantially uniform flow through the pipe 12 which is diverted into the chamber 15, or to by-pass it according to the position of the valve 17 without interrupting the flow.

At the after end of the chamber 15 there are provided one or more jet outlets 14 of which the total area is preferably smaller than that of the inlet port 17 so that water expelled therethrough has a suitably high velocity.

The upper part of the chamber 15 is shaped to form a combustion chamber 20 and this chamber is provided with an air-inlet-valve 21, an exhaust-valve 22, and a fuel-inlet-valve 23, these being conveniently situated in the head of the chamber. The operation of these valves will be described later. A fuel tank 24 provided with a pump 25 communicates with a vaporizing chamber 26 and vents with the fuel-inlet-valve 23, and the vaporizing chamber is arranged to be heated by the exhaust gases, being situated in the exhaust conduit 27. A door 28 provides access to the interior of the exhaust conduit when desired. There is also provided a fuel-controlling valve 29 on the pipe-line between the storage tank 24 and the vaporizer 26.

Within the combustion chamber 20 there is mounted a plate-electrode 30 which is supported from the walls of the chamber on suitable insulators 31, and an electrical connection is made at 32 from the electrode 30 to the line 33 of an outside circuit. This circuit comprises a variable resistance 34, master switch 35, a battery or other source of electric power 36, the electromagnet 37 of a relay switch 38, and the circuit is completed from the magnet 37 to a ground connection 39 on the chamber 15. When the master switch 35 is closed, this circuit is open between the insulated electrode-plate 30 and the chamber 15 until the water level rises in the chamber to provide an electrical connection between these two parts, and when the water level rises to immerse the electrode to a suitable extent to reduce the resistance, the current in the circuit above described is sufficient to energise the magnet 37 and operate the relay switch 38.

The relay switch 38 is spring-controlled so as normally to be held in the position shown in which it engages one of its contacts 41, but when the magnet 37 is energised by a suitably high current it rocks the switch 38 so as to break the circuit at 41 and engage the contact 42.

This relay switch 38 is connected at 43 to a battery or other source of electrical power 44, and the other side of this battery is connected to an insulated pin 45 which projects into the combustion chamber where it carries a contact-piece 46. The pin 45 is normally held in its withdrawn position by means of a spring, but can be pressed inwards for the purpose hereinafter described.

Within the combustion chamber there is pivotally mounted at 47 a lever 48, hereinafter termed the spark hammer, which carries a contact 49 to co-operate with the contact 46; this spark hammer can be moved to close the circuit of the contacts 49, 46, or to separate them when the hammer is moved back to a stop 50. The movement of the hammer is effected by a mechanical connection with the inlet-valve 17 and for this purpose an arm 51 carried by the valve 17 is coupled by a rod 52 to the lower end 53 of the hammer, so that when the valve 17 is in its closed position as illustrated, it maintains the contacts 49, 46 separated, but when it is moved in its opening direction it closes these contacts. Since only a very small movement of the contact 49 is required, the arrangement illustrated in Figure 3 is used in which the member 48 is made in two parts constituting a friction clutch 54. A boss on the arm 48 is pressed by a spring 55 into contact with the surface 54 on the part 56 whereto the link 52 is connected at 53, the spring being adjustable by means of a nut 57. With this arrangement when the valve 17 starts to move in an opening direction it rocks the spark hammer 48 into engagement with the contact 46 so that it completes a circuit therethrough, but when the valve 17 starts to move in its closing direction it swings the hammer 48 so as to disengage the contacts 49, 46, until the arm 48 engages the stop 50, and it is held there whilst the valve continues its movement to its closed position.

The relay switch 38 aforesaid is caused to engage one or other of the contacts 41, 42. The contact 41 is connected to an electromagnet 58 and the contact 42 is connected to another magnet 59, the other ends of these magnets being both connected by the line 60 to the spark hammer 48. It will be seen, therefore, that the two magnets 58, 59 can be selectively energised from the battery 44 by the relay switch 38, but that in either case the circuit is also controlled by the contacts 46, 49.

The electromagnet 58 is arranged to control the air-valve 21 and the exhaust-valve 22 by a construction such as is shown in Figure 5. The armature 61 of the magnet 58 is coupled to a lever 62 on a rocking shaft 63 which carries two fingers 64 engaging the upper ends of the valves 21, 22 respectively so that when the magnet is energised these valves are moved to their open position; they are also provided with the usual controlling springs to return them to their closed position when the magnet is not energised.

The electromagnet 59 is used to energise the fuel-valve 23, and for this purpose an arrangement such as is illustrated in Figure 4 may be used. The armature 65 of the magnet carries an adjustable projection 66 which engages a lever 67 pivoted at 68 and engaging the fuel-valve 23 at 69. When the armature is pulled down by energising of the magnet 59, the projection 66 first causes the lever 67 to be swung about its pivot and open the valve 23, but is then withdrawn so as to release the lever 67 and allow the valve to be closed after a momentary or very brief period of opening. For this purpose the projection 66 is constituted by the end of a lever 70 pivoted on the armature at 71, and having its other end 72 engaging a stop 73 so that when the armature is moved the lever 70 is caused to rock on its pivot to effect disengagement of the projection 66 from the lever 67. The stop 73 is adjustable by means of the nut and screw 74 to provide for selection of adjustment of the period during which the valve remains open, lowering of the stop 73 providing a longer period of opening of the valve 23, and raising it providing a shorter period of opening.

The operation of the unit illustrated in Figure 2 will now be described. Since the chamber 15 is situated below the water-line of the vessel, it will be filled or nearly filled with water to an extent sufficient to provide electrical communication between the chamber 15 and the electrode-plate 30. Pressure is generated in the fuel tank 24 by means of the fuel pump 25 and the vaporizer 26 may be heated by means of an external lamp applied through the doorway 28. Compressed air is blown into the chamber by the valve 21 to provide air for combustion of the first explosive charge. The master switch 35 is now closed and since the water is in contact with the electrode-plate 30, the circuit of the electromagnet 37 is thereby completed, so that it rocks the relay switch 38 to engage the contact 42 which is connected to the electromagnet 59. The pin 45 is pushed in so that its contact 46 engages the contact 49 to complete the circuit for the magnet 59 so that the fuel-valve is operated to inject a charge of fuel into the compressed air now present in the combustion chamber 20. When the pin 45 is released, the contacts 46, 49 are separated and owing to the self-inductance of the coil 59, a spark is produced which ignites the mixture to give an explosion. The pressure thereby generated expels the water in the vessel 15 through the jets 14. The water level falls and when it clears the electrode-plate 30, the circuit of the electromagnet 37 is broken so that the relay switch 38 returns to the position illustrated engaging the contact 41 of the magnet 58. The circuit of this magnet, however, is open at the spark gap 46, 49 so that the magnet is not energised.

At the end of this working stroke, the expulsion of the water reduces the pressure in the chamber 15 to such an extent that the water inlet-valve 17 opens, due to the external pressure of the water thereon, to admit a fresh charge. The opening of the valve 17 rocks the spark hammer 48 as described above so as to close the contacts 49, 46 thereby completing the circuit of and energising the magnet 58 which opens the exhaust valve 22 and the air-inlet-valve 21, thereby permitting escape of the exhaust gases and admitting a charge of air which assists in scavenging and provides the combustion air for the next working stroke. The inflow of water to the chamber 15 by the valve 17 continues until the water level rises to make adequate contact with the electrode-palte 30 so as to cause the magnet 37 to be energised. This causes the relay switch 38 to be disengaged from the contact 41, thereby de-energising the magnet 58 and allowing the exhaust and air valves to close; it also engages the contact 42 thereby energising the magnet 59 which causes the fuel valve to be momentarily opened admitting a charge of fuel into the air in the combustion space 20. The water continues to flow in by the valve 17 compressing the charge of fuel and air by its inertia. When the compression is completed, the water level in the combustion chamber 20 starts to fall, owing to the energy stored in the compressed gases, but immediately on such fall the inlet-valve 17 starts to close and in so doing rocks the spark hammer 48 to open the gap 46, 49, thereby producing a spark which ignites the charge and gives a second explosion. The cycle of operations is thereafter repeated so long as the master switch 35 is kept closed and the fuel supply is maintained.

The timing of the cycle depends largely upon the natural period of pulsation of the water flowing into the chamber 15 and compressing the charge therein, and upon the operation of the relay switch 38 by the water completing the circuit to the electrode-plate 30. The variable resistance 34 in the circuit of the electromagnet 37 provides a control adjustment of the current used to energise the magnet 37; the total resistance in its circuit is made up of the resistance of the water between the electrode-plate 30 and the chamber 15, and the variable resistance 34 and when the latter is increased, the water has to rise to a higher level to reduce the resistance in the circuit before the magnet 37 is fully energised.

Another factor affecting the timing of the cycle is the possibility of variation in the conductivity of the water, as, for example, in a change from fresh water to sea water which has a much higher conductivity. In order to ensure uniformity of working, automatic compensation for such changes may be effected by means of an auxiliary resistance which is variable; this resistance is included in the electrode circuit of the magnet 37, and is automatically adjusted by means of an electromagnet 101 connected in an independent circuit in series with suitable electrodes 102 spaced apart in the water concerned; the armature 103 of the electromagnet carries a contact movable over the resistance and is spring-controlled in a direction to reduce the resistance. The current flowing through the electromagnet depends upon the conductivity of the water and as this increases, it moves the armature against the action of its spring to insert more resistance in the circuit to compensate for the reduced resistance of the water. The spring-control of the armature is preferably adjustable to facilitate the setting of this device. There may also be provided a manually-operated switch 104 to cut out this automatic control when the water continues to be stable, and then the control of the extent of immersion of the electrode-plate 30, and the timing of the cycle of operations is manually effected by means of the resistance 34 in Figure 2.

When the water craft is in motion, there is a steady inflow of water into the pipe 12, and during the expansion stroke of the ignited charge, the valve 17 is closed, but the steady flow of the water is not interfered with since it escapes through the relief-valve 19. As soon as the valve 17 opens to admit water for the next cycle of operations, the relief-valves 19 close and for this purpose they may be spring-controlled or interconnected with the valves 17.

Various modifications may be made in the above apparatus. Thus, for example, instead of relying on the conductivity of the water to provide electrical connection between the electrode-plate 30 and the chamber 15 for the circuit of the electromagnet 37, the arrangement illustrated in Figure 6 may be used in which a switch is provided, operated by the inflowing water to take the place of the electrode-plate. The relay switch indicated generally by the reference 38 is connected with the battery 36, master switch 35 and manually-controlled resistance 34 as in Figure 2, but the circuit is completed through a switch-member 75 constituted by a pivoted arm carrying a float 76 upon which the inflowing water operates to close the switch contacts 77 from their normal open position. These contacts 77 are connected by the line 78 and a holding magnet 79 to the other side of the coil for the relay switch 38 so that when the switch-member 75 rises, the switch 38 is operated. Simultaneously the magnet 79 is energised and closes the branch circuit from the line 78 through the contacts 80 and through two normally closed spring-controlled contacts 81. The closing of the contacts 77 therefore effects closure of the contacts 80 and provides a circuit from the battery 36 by the line 82, contacts 81, contacts 80 and magnets 79 to the coil of the relay-switch 38, thereby maintaining it energised even if the contacts 77 have been separated. The spring-contacts 81 are used because it is necessary to de-energise the magnet for the switch 38 to allow the exhaust and air valves to be opened, and this is effected by providing in association with the coil 59 which operates the fuel-valve, a plunger 83 which holds a spring-pressed hammer 84 in a stressed position. When the magnet 59 is energised, it releases the hammer 84 which rises and engages one of the contacts 81 to break the holding circuit at that point; the relay switch 38 is thereby de-energised and thereby returns to its normal position and when the magnet 59 of the fuel-valve is de-energised the plunger 83 re-engages the hammer 84 and permits the contacts 81 to engage again ready for the next operation.

Figure 7 shows diagrammatically another embodiment of the present invention in which the apparatus is used to produce power by means of a jet or jets of water acting on a turbine or Pelton wheel. In this particular example the source of supply of water is a stream having only a low pressure-head, and the water is introduced by a pipe 85 corresponding to the pipe 12 of Figures 1 and 2. The water chamber 86 with the combustion chamber 87 is similar to that already described, but in this instance there are preferably two such units arranged side by side and they are timed to work alternately so that when one is discharging a jet of water the other is being charged, thereby giving a continuous supply to a turbine indicated generally by the reference 88.

The supply pipe 85 for the water is forked as shown in Figure 8 at 89 to form two branches 90, 91 each supplying one of the power-units, and the water-inlet-valves which correspond to the valve 17 of Figure 2 may be coupled together so that when one is open, the other is closed and vice versa. This may be effected as shown in Figure 8 by means of two valves 92, 93 rigidly secured together and working on a common pivotal axis 94. The operation of this power-unit is exactly the same as that described above and need not be repeated in detail. In order, however, to ensure absolute synchronism in their working, and in their cycles of operation, there is provided on one or both of them an adjustable outlet jet for the water as shown at 95 in Figures 7 and 9. The outlet passage 96 is parallel-sided, and a cover-piece 97 is movable therein to vary the area of the orifice 98 of the jet. The part 97 is carried on a bellcrank lever 99 adjustable by means of screws 100. The time occupied in emptying the chamber on an expulsion stroke is governed by the area of the outlet 98 therefrom, so that by suitable adjustment of one or both of these outlet jets exact synchronism of operation of the two power-units can be secured and maintained.

This form of the apparatus provides a supply of mechanical power from the rotation of the turbine or water-wheel 88, and it is not essential that two power-units should be supplied for driving such a turbine, since it may be made sufficiently massive to serve as a flywheel to operate at a substantially uniform speed even when supplied only from a single intermittent jet.

We claim:

1. In a power plant, the combination of a combustion chamber, means for introducing a combustible charge into said chamber, means for igniting said charge, means for exhausting and scavenging said chamber, an automatic inlet valve for admitting water to said chamber, and an open outlet of smaller area than the said inlet to deliver at a high velocity therefrom the water expelled by the explosion of said charge, said charge-introducing means and exhaust means comprising air, fuel and exhaust valves, electromagnets operatively associated with said air, fuel, and exhaust valves, a control circuit for said magnets, means controlled by the entry of water into said chamber for actuating said control circuit.

2. A power plant according to claim 1, including a movable contact in circuit with said electromagnets and operatively connected to the water-inlet valve of the chamber so as to be moved to its closed position by opening movement of said valve and to its open position by closing movement of said valve.

3. In a power plant according to claim 1, the combination, with said control circuit, of a switch therein and a float member operated by the entry of water into said chamber to effect movement of said switch.

4. A power plant according to claim 1 comprising a fuel valve spring-pressed towards its closed position, a lever engaging said valve and movable to open the valve, an electromagnet, an armature movable by said electromagnet, a rocking detent carried by said armature and engaging said lever to open the valve, and adjustable means for rocking said detent when moved by said armature to disengage it from said lever and allow said valve to close.

5. Apparatus according to claim 1, said last means including a pair of relatively insulated contacts in said chamber adapted to be electrically connected by water entering said chamber.

6. Apparatus according to claim 1, including spring means biasing said air and exhaust valves toward their closed positions.

7. Apparatus according to claim 1, including spring means biasing said fuel valve toward its closed position, and means connecting said fuel valve and its electromagnet for momentarily opening said valve upon energization of said magnet.

CHARLES STAFFORD.
FREDERICK REED.

REFERENCES CITED

The following references are of record in the file of this patent:

UNITED STATES PATENTS

| Number | Name | Date |
|---|---|---|
| 1,117,351 | Edlin | Nov. 17, 1914 |
| 1,258,570 | Humphrey | Mar. 5, 1918 |
| 1,265,784 | Humphrey | May 14, 1918 |
| 1,725,881 | Porsche | Aug. 27, 1929 |
| 1,824,074 | Christie | Sept. 22, 1931 |
| 2,202,087 | Christie | May 28, 1940 |

FOREIGN PATENTS

| Number | Country | Date |
|---|---|---|
| 363,022 | Great Britain | Dec. 17, 1931 |
| 228,230 | Germany | Nov. 4, 1910 |